(12) United States Patent
Bilgin et al.

(10) Patent No.: US 8,539,260 B2
(45) Date of Patent: Sep. 17, 2013

(54) METHOD, APPARATUS, AND SYSTEM FOR ENABLING PLATFORM POWER STATES

(75) Inventors: Selim Bilgin, Hillsboro, OR (US); Lily P. Looi, Portland, OR (US); Jeffrey C. Swanson, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 619 days.

(21) Appl. No.: 12/798,478

(22) Filed: Apr. 5, 2010

(65) Prior Publication Data

US 2011/0246798 A1 Oct. 6, 2011

(51) Int. Cl.
*G06F 1/26* (2006.01)
*G06F 1/32* (2006.01)
*G06F 15/16* (2006.01)

(52) U.S. Cl.
USPC ........... 713/300; 713/310; 713/320; 713/323; 713/324; 709/237

(58) Field of Classification Search
USPC .................. 713/300, 310, 320–324, 330, 340
See application file for complete search history.

(56) References Cited

U.S. PATENT DOCUMENTS

| | | | | |
|---|---|---|---|---|
| 6,961,780 B2* | 11/2005 | Kuusinen et al. | ............. | 709/238 |
| 8,073,984 B2* | 12/2011 | Lydon et al. | .................... | 710/10 |
| 2004/0003286 A1* | 1/2004 | Kaler et al. | .................... | 713/201 |
| 2006/0212732 A1* | 9/2006 | Mashimo et al. | ............. | 713/300 |
| 2007/0127581 A1* | 6/2007 | Connor et al. | ................. | 375/257 |
| 2007/0271387 A1* | 11/2007 | Lydon et al. | .................... | 709/230 |
| 2008/0005636 A1* | 1/2008 | Conrad et al. | ................. | 714/748 |

FOREIGN PATENT DOCUMENTS

| JP | 2005-267100 A | 9/2005 |
|---|---|---|
| JP | 2006-261854 A | 9/2006 |
| JP | 2009-538562 A | 11/2009 |

OTHER PUBLICATIONS

Office Action for Japanese Patent Application No. 2011-082525, mailed on May 22, 2012, 2 Pages of Japanese Office Action and 2 Pages of English Translation.

* cited by examiner

*Primary Examiner* — Fahmida Rahman
(74) *Attorney, Agent, or Firm* — Blakely, Sokoloff, Taylor & Zafman LLP (57) ABSTRACT

To address the need for power management, the following facilitates maintaining power states in an efficient manner based at least in part on managing packets at different layers of an input/output interface that supports multiple layers. One specific example prevents a destructive event for link layer control logic because packets and information might have been lost or dropped due to a hang condition and/or a dropped packet. In yet another example of power management, this facilitates a low power platform state by preventing the loss of packets or data upon exiting a platform power state upon initiation of a link reset condition by preventing certain types of packets from reaching link layer controller logic.

13 Claims, 10 Drawing Sheets

METHOD, APPARATUS, AND SYSTEM FOR ENABLING PLATFORM POWER STATES

FIELD

Embodiments of the invention relate to the field of power management, and according to one embodiment, a method and apparatus, and system for managing packets with respect to layers and link layer control logic.

GENERAL BACKGROUND

With the increasing importance of reducing the power consumption of computing platforms, the processor architecture and design trends are moving towards a direction where more opportunities of total power gating are being pursued.

Power gating is the technique wherein circuit blocks that are not in use are temporarily turned off to reduce the overall leakage power of the chip. This temporary shutdown time can also call as "low power mode" or "inactive mode". In contrast, when circuit blocks are required for operation once again they are activated to "active mode". These two modes are switched at the appropriate time and in the suitable manner to maximize power performance while minimizing impact to performance. Thus goal of power gating is to minimize leakage power by temporarily cutting power off to selective blocks that are not required in that mode.

As an electronic device transitions to a low power state from an active mode power state, the state information of the respective device is saved to ensure proper operation upon a subsequent exit from the low power state. Unfortunately, maintaining an excessive amount of on-die memory to store the necessary state information is cost prohibitive.

Typically, high speed interfaces utilize a physical layer and a link layer to facilitate the transmission of information. One example of a solution for an efficient means of exiting a low power state is a link reset for the layers associated with the high speed interface. The main purpose of the link reset is to recover a failing link. Nonetheless, this feature enables a control layer of an input/output interface that support multiples layers, such as, protocol, link, and physical to start operation with a clean slate immediately followed by a handshake and parameter exchange.

However, in some cases, link reset is a destructive event for link layer control logic because any packets and information in flight will get dropped.

DETAILED DESCRIPTION

In various embodiments, the following descriptions of the figures facilitates maintaining power states in an efficient manner based at least in part on managing packets at different layers of an input/output interface that supports multiple layers. One specific example is an embodiment that prevents a destructive event for link layer control logic because packets and information might have been lost or dropped due to a hang condition and/or a dropped packet. In yet another example of an embodiment, the claimed subject matter facilitates a low power platform state by preventing the loss of packets or data upon exiting a platform power state upon initiation of a link reset condition by preventing certain types of packets from reaching a link layer controller logic.

In summary, in various embodiments, an agent facilitates a low platform power state by supporting a mode that prevents certain types of packets from reaching a link layer controller logic. First, the mode of operation is enabled. Subsequently, a link low power state is entered for the particular link. Eventually, the processor cores and glue logic will enter a low platform power state.

As is well known, a power state referred to as a "C-state" manages power consumption at a processor core level. In addition to the C state, the claimed subject matter utilizes common logic that communicates with both multi-core devices and acts as a glue for both cores. In one embodiment, the common logic may be referred to as uncore. However, it is not limited to this depiction. One may utilize a system interface as a common logic to both cores. In summary, if both the cores and uncore adhere to a low power state; the entire platform will be in a low platform power state.

Figure 1:
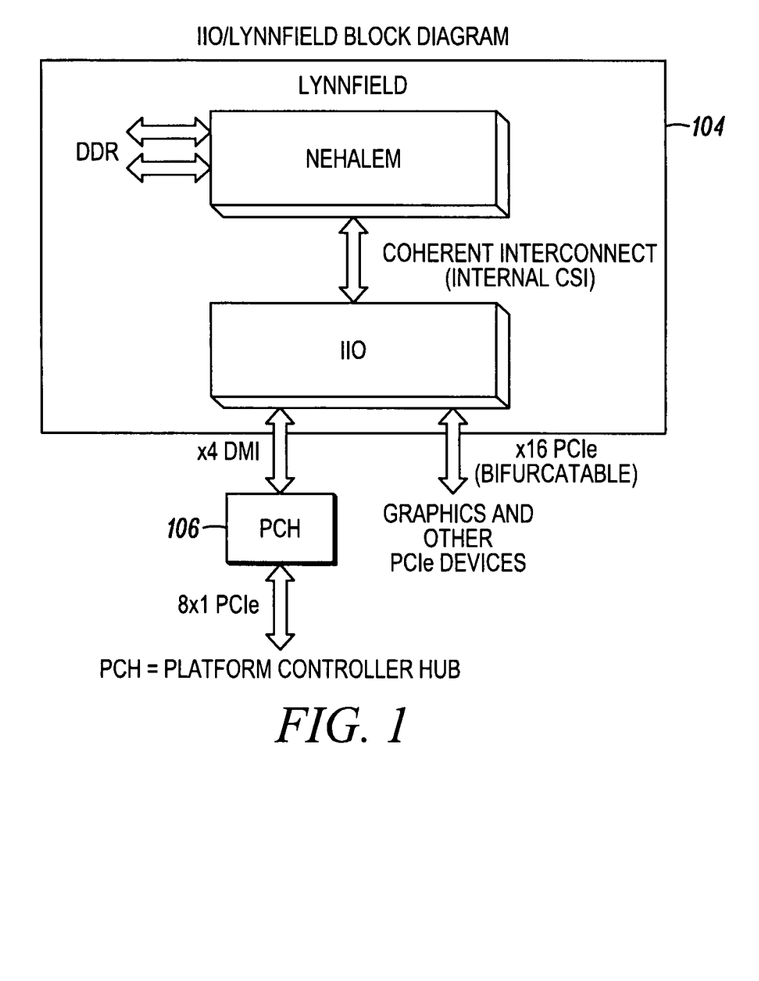
FIG. 1 is a block diagram of an agent in accordance with an embodiment of the present invention.

FIG. 1 is a block diagram of an agent in accordance with an embodiment of the present invention. In this embodiment, the agent 104 comprises a processor core coupled to an integrated input output block. In one embodiment, the agent may be the Intel Lynnfield product, also known as, Intel® Core™ i5-750, Core™ i7-860, and Core™ i7-870 processors as well as the Xeon X3400 processor series that includes a Nehalem core with a memory controller hub (MCH) or Integrated Input Output block (IIO) in the same package. In one embodiment, the core communicates with the IIO via the Intel QuickPath Interconnect (QPI, also known as CSI).

However, the claimed subject matter is not limited to a product that includes a MCH/IIO within a same package as a processor core. Furthermore, it is not limited to a QPI interconnect between the processor core and IIO.

In this embodiment, the agent may be coupled to a Platform Controller Hub (106) via a Direct Media Interface (DMI) interconnect. However, the claimed subject matter is not limited to the agent being coupled to a PCH via a DMI interconnect.

In yet another embodiment, the agent may be utilized in a network fabric that is depicted in connection with FIG. 2 that will be discussed later.

Figure 2:
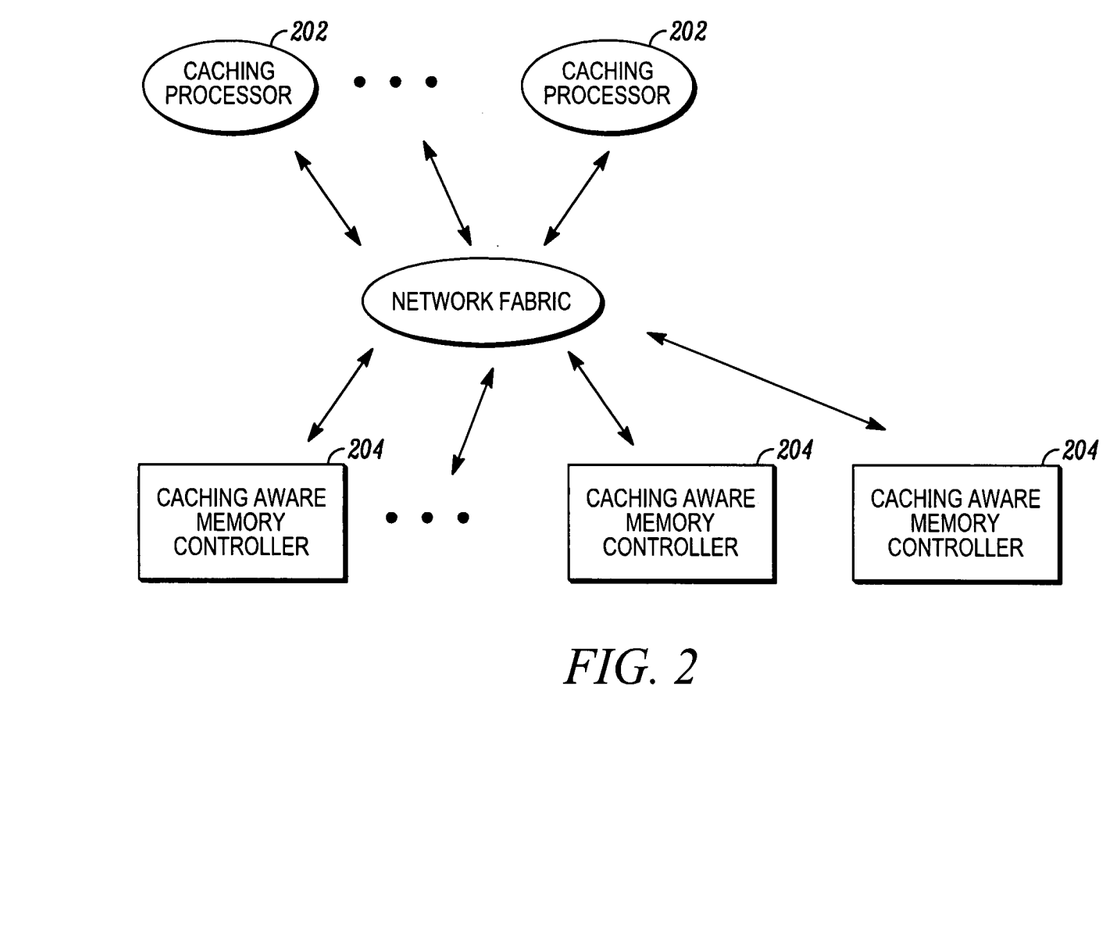
FIG. 2 is a protocol architecture as utilized by one embodiment of the present invention.

FIG. 2 is a protocol architecture as utilized by one embodiment. The architecture depicts a plurality of agents coupled to a network fabric. In one embodiment, the agents may all be caching processors 202 and caching aware memory controllers 204. In contrast, in yet another embodiment, some of the agents are caching agents.

For example, the network fabric adheres to a layered protocol scheme and may comprise either or all of: a physical layer, a link layer, a protocol layer, a routing layer, a transport layer, and a protocol layer. In another embodiment, the layered protocol scheme comprises only a physical layer, a link layer, a routing layer, and a protocol layer. In yet another embodiment, the layered protocol scheme comprises only a physical layer, a link layer, and a protocol layer.

The fabric facilitates transporting messages from one protocol (home or caching agent) to another protocol for a point to point network. In one aspect, the figure depicts a cache coherence protocol's abstract view of the underlying network.

Figure 3:
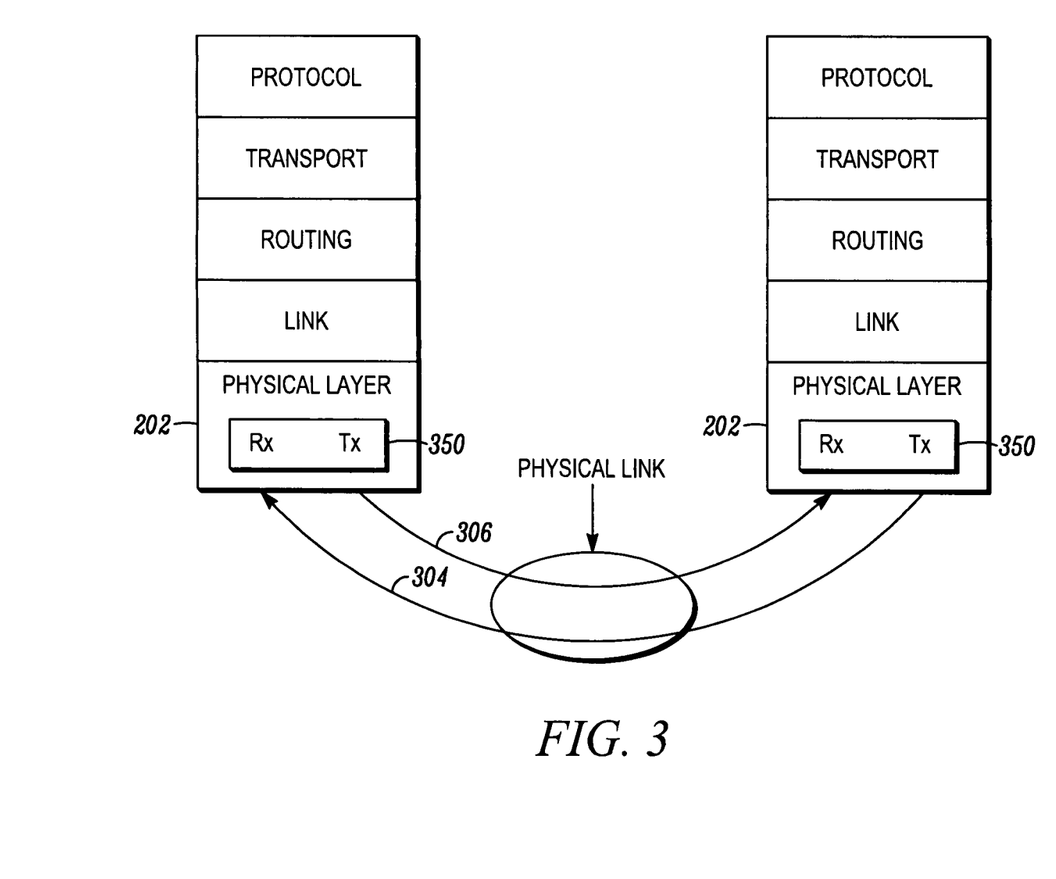
FIG. 3 is a block diagram for a physical interconnect utilized in accordance with the claimed subject matter.

FIG. 3 is a block diagram of an apparatus for a physical interconnect utilized in accordance with the claimed subject matter. In one embodiment, the apparatus depicts a physical layer for a cache-coherent, link-based interconnect scheme for a processor, chipset, and/or JO bridge components. For example, the physical interconnect may be performed by each physical layer of an integrated device. Specifically, the physical layer provides communication between two ports over a physical interconnect comprising two uni-directional links. Specifically, one uni-directional link 304 from a first transmit port 350 of a first integrated device to a first receiver port 350 of a second integrated device. Likewise, a second uni-directional link 306 from a first transmit port 350 of the second integrated device to a first receiver port 350 of the first integrated device. However, the claimed subject matter is not limited to two uni-directional links. One skilled in the art appreciates the claimed subject matter supports any known signaling techniques, such as, bi-directional links, etc.

However, the layered protocol scheme is not limited to the depicted layers. In contrast, in another embodiment, the layered protocol scheme may comprise either or all of: a link layer, a physical layer, a protocol layer, and a routing layer. In yet another embodiment, the layered protocol scheme comprises only a link layer, a physical layer, and a protocol layer.

Figure 4:
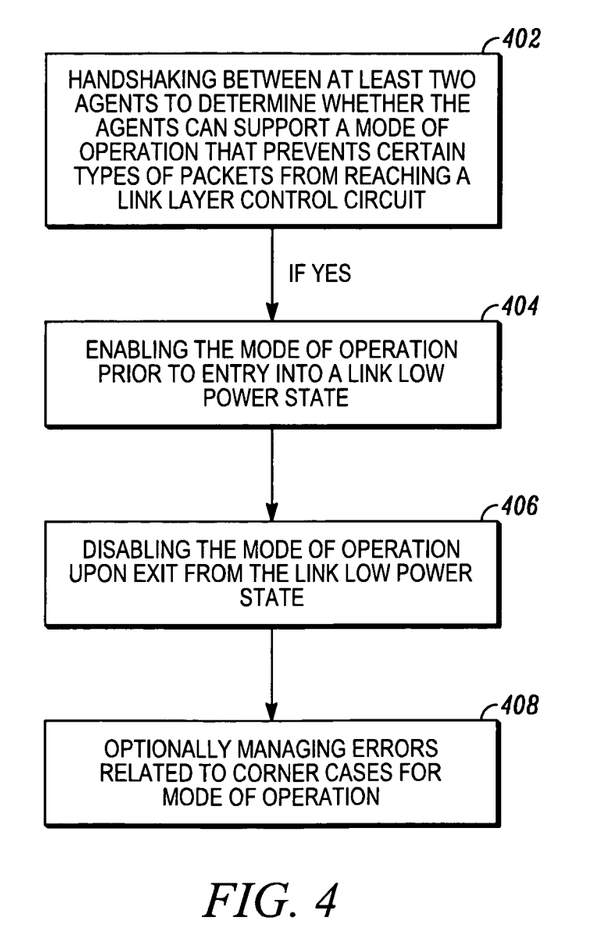
FIG. 4 is a method for managing a power state utilized in accordance with the claimed subject matter.

FIG. 4 is a method for managing a power state utilized in accordance with the claimed subject matter. In this embodiment, the flowchart depicts a method for managing a power state for preventing loss of packets or data upon exiting a platform power state. In a specific embodiment, the method for managing a power state prevents loss of packets or data upon exiting a platform power state upon initiation of a link reset condition. In yet still another specific embodiment, the method for managing a power state prevents loss of packets or data upon exiting a platform power state upon initiation of a link reset condition by preventing certain types of packets from reaching a link layer controller logic.

In one embodiment, the certain types of packets that are prevented from reaching the link layer controller logic might have resulted in a destructive or hang condition. For example, some examples of packet types that are prevented may include, but are not limited to, any packet that causes the platform to eventually hang if lost. For example, the transmitting agent or circuit thinks it is sent, but either that did not materialize or the receiving agent or circuit might have not received it). Specifically, for one embodiment of a QPI (QuickPath interconnect) the types of packets are protocol layer packets, that may belong to any of the eight Virtual Channels; HOM, SNP, NDR, DRS, NCB, NCS, ICS and IDS. In yet another embodiment that utilizes QPI, the certain type of packet may be determined from a link layer perspective, these packets are identified through the upper nibble of their 8-bit opcode. Therefore, these packets are used by the protocol layer of the fabric to initiate transactions or respond to existing ones.

However, the claimed subject matter is not limited to the QPI implementation and/or the virtual channels. One skilled in the art appreciates defining the type of data and packet to prevent from reaching a link layer controller logic based on other factors such as, priority, interrupts, timing, latency, reliability, etc.

In a decision block 402, a handshaking occurs between at least two agents to determine whether the agents support the mode of operation for the low power state and to prevent certain types of packets of reaching the link layer controller logic. Specifically, the agents utilize the existing link initialization and parameter exchange protocols of their respective input/output link or fabric in use to communicate their ability to support this mode if requested as well as their request for the remote agent to support this mode in its corresponding layers of control. Based on the resolution of this handshake, the devices can then decide the platform's capability to go into lower power states as well as turning on the support for the mode of preventing certain types of packets of reaching the link layer controller logic.

In an action block 404, the agents are enabling the mode of operation for preventing certain types of packets of reaching the link layer controller logic upon entry into a low platform power state. In one embodiment, the entry point to this low platform power state is either the initiation or the acknowledgement of the request to enter the link low power state, depending on the agent asserting backpressure being the initiator (master) or the responder (slave) on the protocol.

In summary, in one embodiment, the mode of operation of preventing certain types of packets of reaching the link layer occurs prior to a link low power mode. In this embodiment, this mode of operation is referred to as backpressure. Furthermore, the link low power mode occurs prior to the platform low power mode.

In an action block 406, one agent is disabling the mode of operation upon exit from the link low power state.

After power is restored to the component(s), the agent(s) which asked the remote agent to enable backpressure is responsible for either sending a special packet or initiating a link initialization. The agents that have backpressure enabled are responsible to remove it when they observe the initiation of link initialization or when they receive the above mentioned special packet. If power was removed in the process, clearly there is no notion of backpressure remaining in that particular agent on the platform; hence it is automatically released to be followed by link initialization. Other cases where agents remove backpressure when enabled include the failed entry to the link power state (master initiating the request and the slave not acknowledging) and the case where a critical packet (retriable packet in QPI terminology) is received.

In action block 408, the agent may optionally manage conditions related to corner cases for the mode of operation of preventing certain packets from reaching the link layer controller logic. For example, in one optional embodiment, if the agent that is the responder (slave) to the link low power entry initiation receives a erroneous packet after acknowledging the entry into the link low power state, when backpressure is enabled, it will abort the expected entry into the link low power state, keep backpressure intact and will also take the precaution not to send any critical packets down the fabric. It will need to handle the communication error recovery as indicated by the corresponding specification of the high speed I/O controller implementation. When backpressure is disabled, such issues are normally handled by the slave agent by keeping the expected entry into the link low power state intact.

Figure 5:
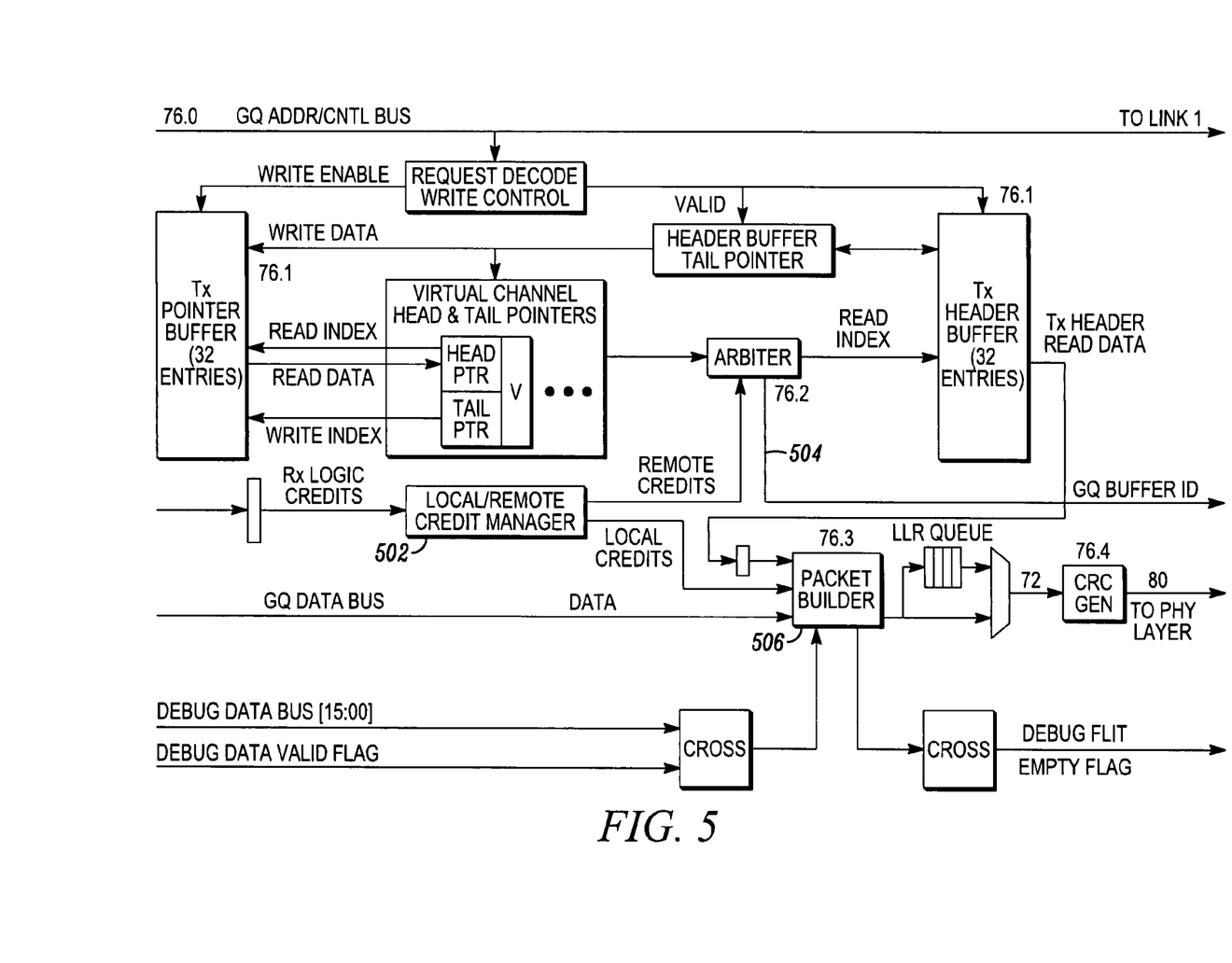
FIG. 5 is a block diagram of a link layer utilized in accordance with the claimed subject matter.

FIG. 5 is a block diagram of a link layer utilized in accordance with the claimed subject matter. In this diagram, a transmitter portion block diagram is utilized. As previously discussed, a mode of operation of preventing certain types of packets from reaching a link layer controller portion.

In one embodiment, blocks 502 and 504, credit manager and arbiter, depict link layer controller circuitry to facilitate this mode of operation for preventing certain types of packets from reaching the link layer by manipulating the credits such that the transmit block has zero credits to prevent any transmission of packets. In one embodiment, credit manager" and arbiter indicate a situation of no credit availability. In this embodiment, credits are required to be able to arbitrate, build, and send down a protocol layer message. Consequently, the backpressure is achieved due to the lack of credits to arbitrate, build, and send down the protocol layer message. In this embodiment, backpressure results in preventing the protocol layer messages from reaching the packet builder circuitry 506.

However, the claimed subject matter is not limited to the preceding embodiments of manipulating credits to prevent transmission of packets to achieve back pressure. Alternatively, in other embodiments, the packets may be stalled or blocked at a point where the request for the protocol level packet comes in. Alternatively, in another embodiment, the packets may be stalled or blocked prior to leaving the package. In still another embodiment, a memory structure is utilized to replay a packet in the event they are lost. For example, in a specific embodiment for QPI, one may utilize a Link Level Retry Queue.

Figure 6:
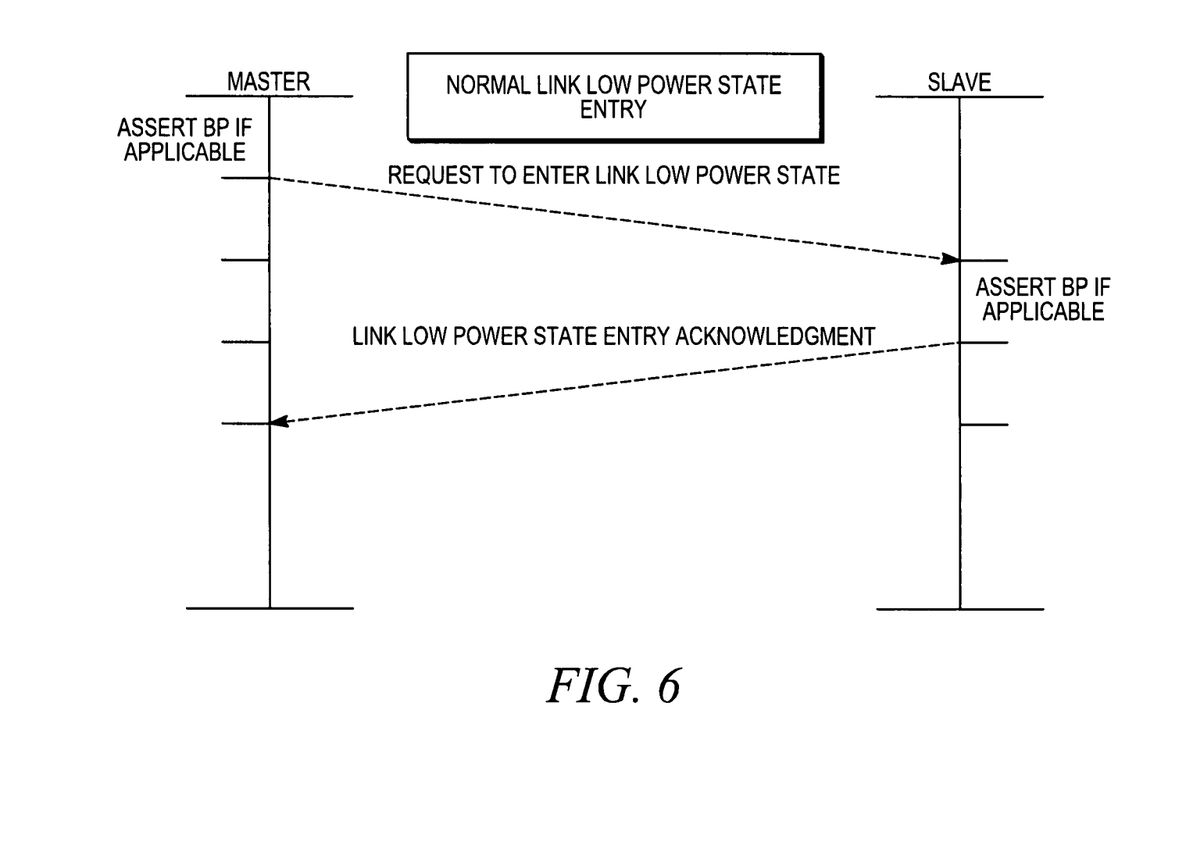
FIG. 6 is a timing diagram utilized in accordance with the claimed subject matter.

FIG. 6 is a timing diagram utilized in accordance with the claimed subject matter. In this embodiment, a master and a slave agent communicate via signals. Initially, if the master supports the mode of operation, the master asserts the mode of operation for preventing certain types of packets from reaching the link layer controller logic (designated as BP) and requests to enter the link low power state to the slave. In response, if the slave supports the mode of operation, the slave asserts the mode of operation for preventing certain types of packets from reaching the link layer controller logic (designated as BP) and acknowledges the link low power state to the master.

Figure 7:
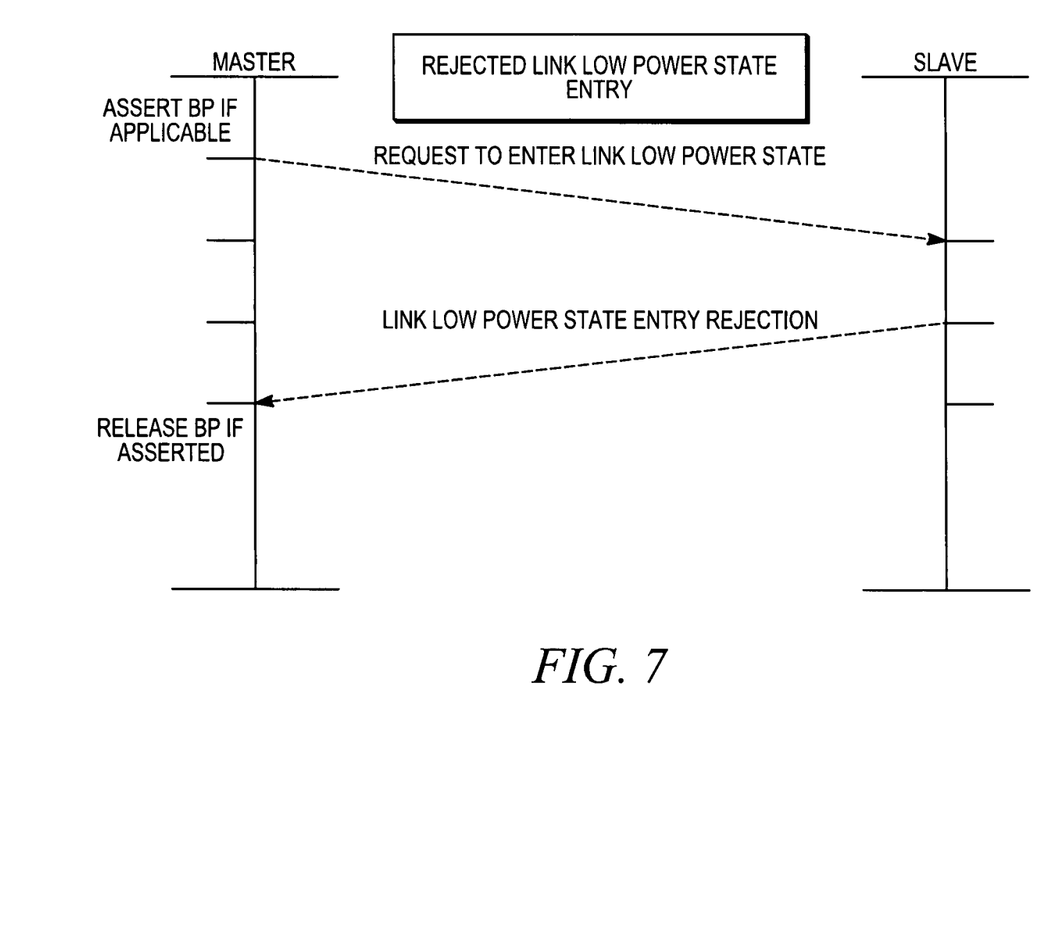
FIG. 7 is a timing diagram utilized in accordance with the claimed subject matter.

FIG. 7 is a timing diagram utilized in accordance with the claimed subject matter. In contrast to FIG. 6, this figure depicts the slave rejecting the power state since it fails to support the mode of operation.

Figure 8:
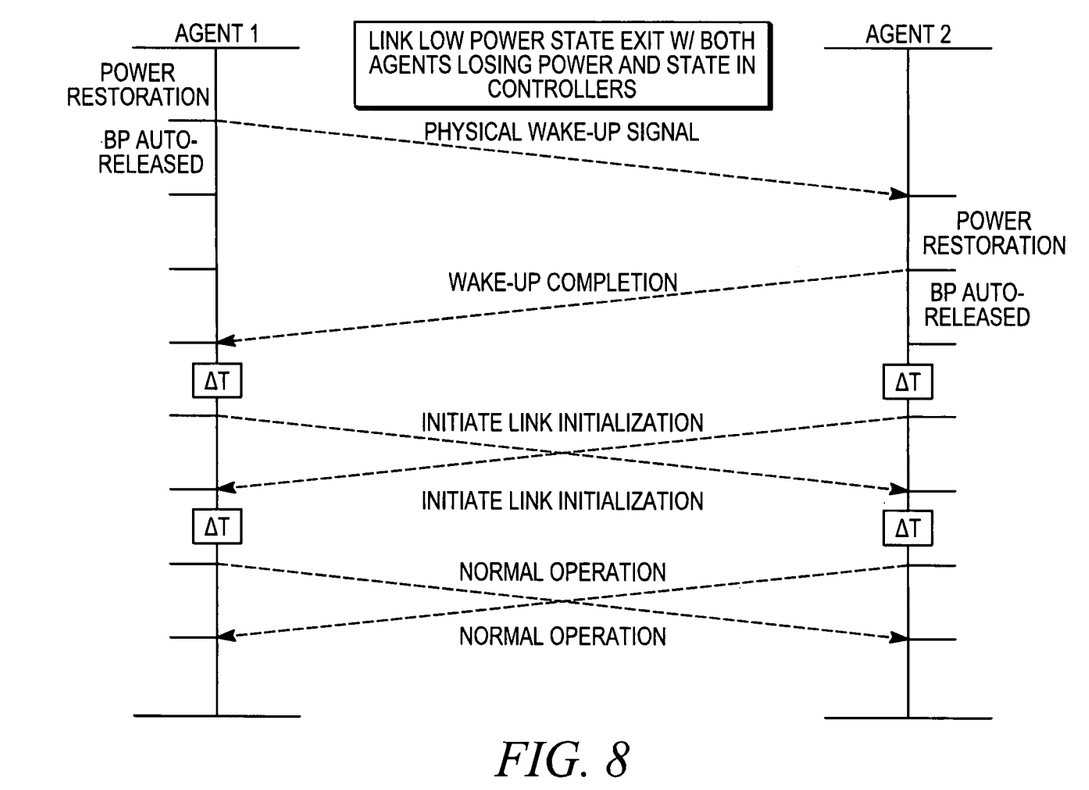
FIG. 8 is a timing diagram utilized in accordance with the claimed subject matter.

FIG. 8 is a timing diagram utilized in accordance with the claimed subject matter. This timing diagram illustrates exiting the link low power state and initiating wake up and link initialization that concludes in normal operation for both agents.

Figure 9:
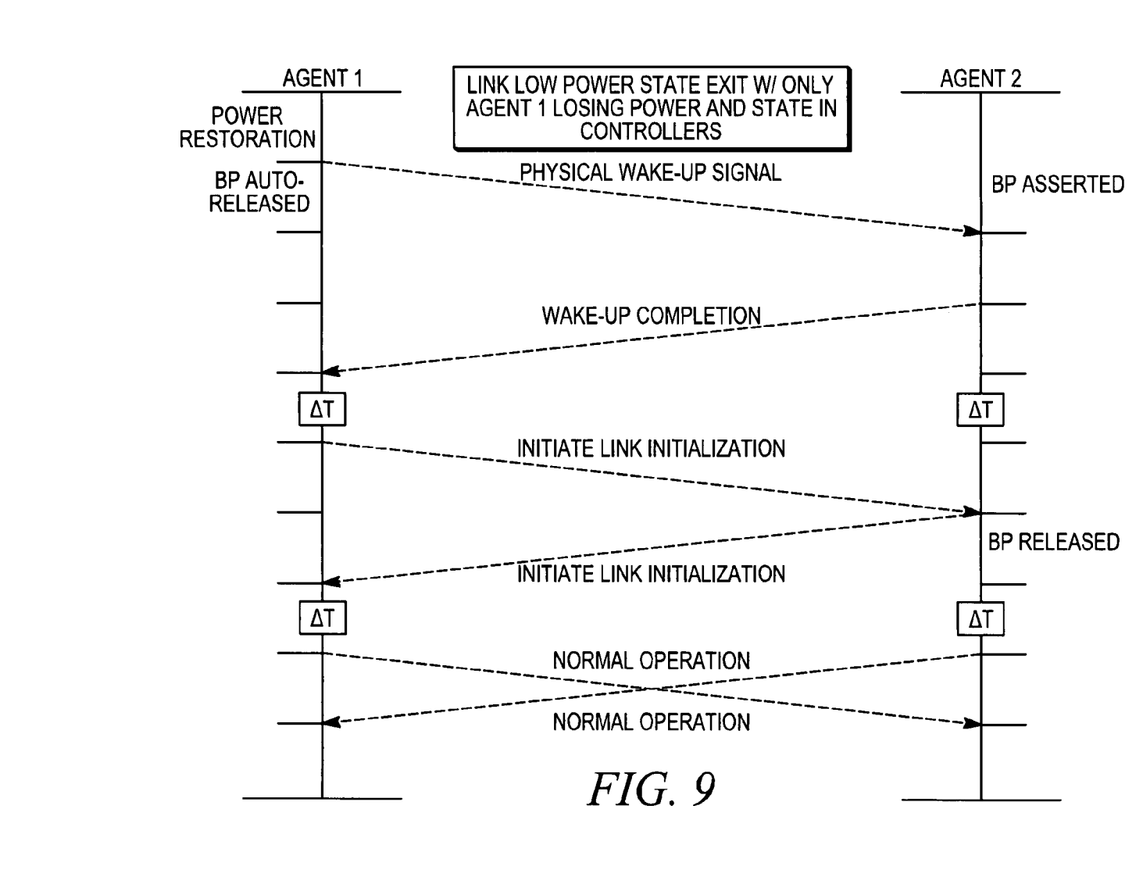
FIG. 9 is a timing diagram utilized in accordance with the claimed subject matter.

FIG. 9 is a timing diagram utilized in accordance with the claimed subject matter. This timing diagram illustrates exiting the link low power state and initiating wake up and link initialization that concludes in normal operation for only agent 1.

Figure 10:
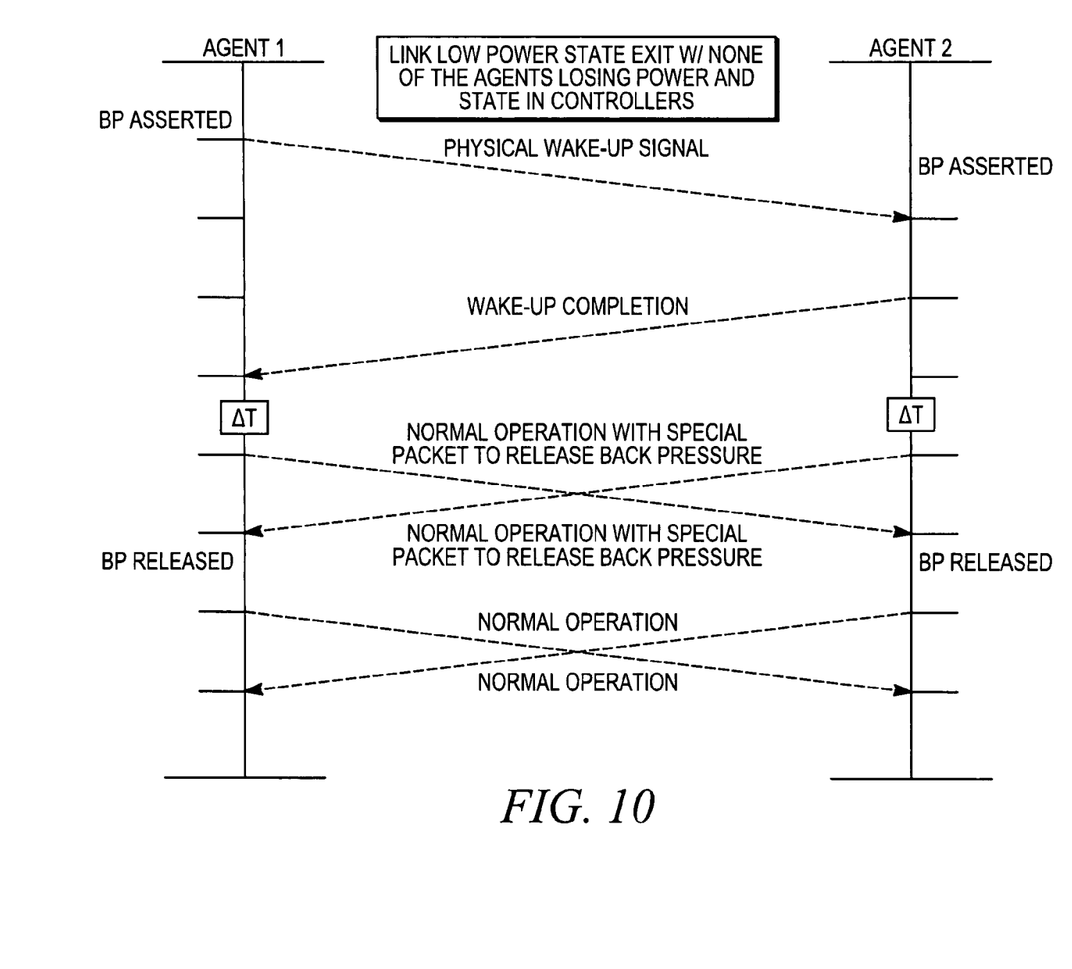
FIG. 10 is a timing diagram utilized in accordance with the claimed subject matter.

FIG. 10 is a timing diagram utilized in accordance with the claimed subject matter. This timing diagram illustrates exiting the link low power state and initiating wake up and link initialization that concludes in normal operation for none of the agents losing power.

Embodiments may be implemented in code and may be stored on a storage medium having stored thereon instructions which can be used to program a system to perform the instructions. The storage medium may include, but is not limited to, any type of disk including floppy disks, optical disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method for managing an interface between at least a first agent and a second agent comprising:
   handshaking between at least the first agent and the second agent to determine whether the agents can prevent certain types of packets;
   if so, enabling the prevention of the certain types of packets prior to entry into a link low power state that could result in a destructive or hang condition, wherein the certain types of packets that are prevented from reaching a link layer control circuit are identified by an upper nibble of an opcode; and
   disabling the prevention of certain types of packets upon exit from the link low power state, and aborting the entry into the link low power state when an erroneous packet is received.

2. The method of claim 1 wherein the interface supports a link layer and a physical layer.

3. The method of claim 1 wherein the certain types of packets that are prevented from reaching the link layer control circuit are protocol layer packets.

4. An interface for a first agent comprising:
   a physical layer of the interface to transmit an enable signal to a second agent, coupled to the first agent via a link, to enter a mode of operation that prevents certain types of packets from reaching a link layer control circuit to facilitate entry into a link low power state, wherein the certain types of packets that are prevented from reaching the link layer control circuit which could result in a destructive or hang condition are identified by an upper nibble of an opcode;
   the link layer control circuit to disable the mode of operation upon a certain condition to facilitate normal mode of operation, and to abort the entry into the link low power state when an erroneous packet is received.

5. The interface for claim 4 wherein the certain condition is a special packet.

6. The interface for claim 4 wherein the certain condition is a link initialization.

7. The interface of claim 4 wherein the interface supports a link layer and a physical layer.

8. The interface of claim 4 wherein the certain types of packets that are prevented from reaching the link layer control circuit are protocol layer packets.

9. A method for managing an interface between at least a first agent and a second agent comprising:
   handshaking between at least the first agent and the second agent to determine whether the agents can support a mode of operation that prevents certain types of packets which would result in a destructive or hang condition from reaching a link layer control circuit, wherein the certain types of packets that are prevented from reaching a link layer control circuit are identified by an upper nibble of an opcode;

if so, enabling the mode of operation prior to entry into a link low power state;

aborting entry into the link low power state when an erroneous packet is received;

entering a platform low power state after entry into the link low power state; and disabling the mode of operation upon exit from the link low power state.

10. The method of claim 9 wherein the interface supports a link layer and a physical layer.

11. The method of claim 9 wherein the certain types of packets that are prevented from reaching the link layer control circuit are protocol layer packets.

12. An interface for a first agent to facilitate a link low power state comprising:

a credit manager circuit to manipulate credits to determine whether transmit block has zero credit so as to prevent transmission of certain types of packets that could result in a destructive or hang condition;

a physical layer of the interface to transmit an enable signal to a second agent, coupled to the first agent via a link, to enter a mode of operation that prevents certain types of packets to facilitate entry into a link low power state;

a link layer control circuit to disable the mode of operation upon a certain condition to facilitate normal mode of operation.

13. The interface for claim 12 wherein the certain condition is a link initialization.

\* \* \* \* \*

UNITED STATES PATENT AND TRADEMARK OFFICE
CERTIFICATE OF CORRECTION

PATENT NO.       : 8,539,260 B2
APPLICATION NO.  : 12/798478
DATED            : September 17, 2013
INVENTOR(S)      : Bilgin et al.

Page 1 of 1

It is certified that error appears in the above-identified patent and that said Letters Patent is hereby corrected as shown below:

In the Specification

In column 3, at line 15 delete, "and/or JO" and insert -- and/or IO --.

Signed and Sealed this
Sixth Day of May, 2014

Michelle K. Lee
*Deputy Director of the United States Patent and Trademark Office*